No. 639,732. Patented Dec. 26, 1899.
W. JENKINS.
BALL BEARING FOR WHEELS.
(Application filed Jan. 9, 1899.)

(No Model.)

Witnesses

William Jenkins
Inventor
per his Attorney
Jas Leith Ross

UNITED STATES PATENT OFFICE.

WILLIAM JENKINS, OF TORONTO, CANADA, ASSIGNOR OF ONE-HALF TO JOSEPH DOUST, OF SAME PLACE.

BALL-BEARING FOR WHEELS.

SPECIFICATION forming part of Letters Patent No. 639,732, dated December 26, 1899.

Application filed January 9, 1899. Serial No. 701,620. (No model.)

*To all whom it may concern:*

Be it known that I, WILLIAM JENKINS, a subject of Her Majesty the Queen of Great Britain and Ireland, residing at Toronto, Canada, have invented certain new and useful Improvements in Ball-Bearings for Wheels; and I do hereby declare the following to be a full, clear, and exact description of the same, reference being had to the accompanying drawings, in which—

Figure 1:
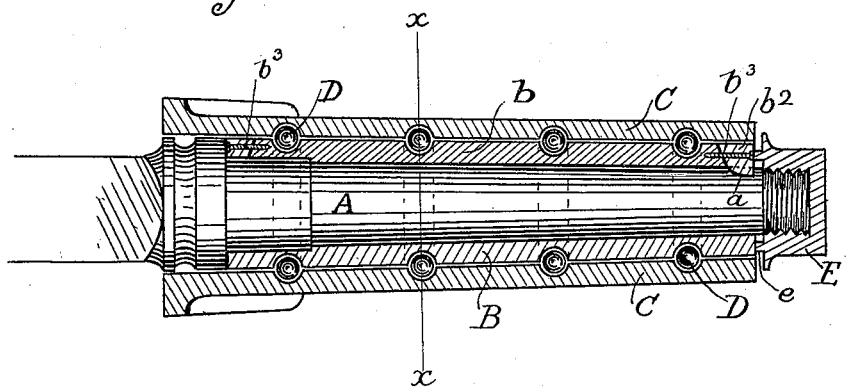
Figure 2:
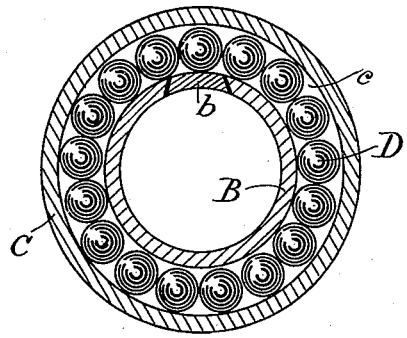

Figure 1 is a longitudinal section of the axle and bearings. Fig. 2 is a cross-section of the axle and ball-bearings on the line $xx$ in Fig. 1.

Similar letters refer to similar parts throughout both views.

In the drawings I have shown my improvement as applicable to a wagon or carriage wheel; but while I have found it convenient to illustrate my improvement as so applied the same may be applied to other and different wheels without departing from the spirit of my invention.

A is the axle.

B is a sleeve fitted over the arm of the axle.

C is a boxing to be fitted into the hub of the wheel.

D D D D are the balls of the bearing.

The outer surface of the sleeve B is provided with one or more circumferential grooves, and the inner surface of the boxing C is provided with corresponding circumferential grooves registering therewith and together forming ball-races $c\ c\ c\ c$ for the balls D D D D. The sleeve B is provided with an opening through which the balls D D are inserted into the ball-races from the interior of the sleeve B after it is fitted into the boxing C.

Where I use two or more ball-races in the same bearing, I prefer to have in the sleeve B a longitudinal removable portion or strip $b$, and when the strip $b$ is removed the balls of the bearing can readily be inserted into the ball-races through the opening left on removal of the strip $b$. This removable portion or strip $b$ may be secured in the sleeve B by screws $b^3\ b^3$ at the ends, as shown in Fig. 1, or in any desired manner. I may use a separate opening at each race of any desired form closed by a separate removable portion. A round opening may be made and each removable portion or strip screwed in.

The sleeve B is made fast upon the axle-arm, but should be readily detachable therefrom. The sleeve may be prevented from turning on the axle-arm by having on its inner surface a projection or feather $b^2$, which fits into a corresponding indentation $a$ on the axle-arm, thus preventing the sleeve B from turning upon the axle A.

I make the removable portion or strip $b$ in the sleeve B at the top—*i. e.*, above the axle-arm—of the sleeve B, because at the top or highest part of the ball-race there is little or no wear.

The various parts hereinbefore mentioned are assembled as follows: The boxing C is first fitted into the wheel-hub and the sleeve B passed into the boxing C, the strip $b$ having been first removed. From the interior of the sleeve B, through the opening left on removal of the strip $b$, I insert the balls D D D D into their respective races and then replace the strip $b$, closing the opening. The wheel is then put upon the axle-arm, the sleeve B fitting over the axle-arm. The projection $b^2$ on the sleeve B prevents it from turning upon the axle A. The wheel may be kept from moving longitudinally upon the axle by a suitable nut on the end of the axle-arm. The nut should come in contact with the sleeve B, but should not come in contact with the revolving boxing C. As the nut does not come in contact with any part which revolves, it will not be apt to become loose from the rotation of the wheel.

It will readily be seen that if the sleeve B is made fast upon the axle-arm it will be impossible for the wheel to come off, as the balls of the bearing will serve as keys to prevent the boxing C from moving longitudinally upon the sleeve B.

It will be noticed that the wheel can readily be removed from the axle without in any way disturbing the ball-bearings, which do not come in contact with the axle. When the sleeve B becomes worn, it can readily be replaced.

I prefer to make the sleeve B and boxing C of cast-steel; but any other suitable material may be used.

Having fully described my invention, what I claim, and desire to secure by Letters Patent, is—

1. In a ball-bearing for a wheel, a hub-boxing and a sleeve made fast upon the axle-arm and fitting in the boxing which turns thereon, the exterior surface of the sleeve having circumferential grooves registering with corresponding grooves around the interior surface of the boxing forming ball-races for the balls of the bearing, the sleeve having an opening therethrough through which the balls are inserted into the races from the interior of the sleeve and the strip seated in said opening, substantially as described.

2. In a ball-bearing for a wheel a hub-box, a wheel-axle and a sleeve made fast upon the axle-arm and held thereon by the axle-nut which is out of contact with the boxing of the hub, the sleeve fitting into the boxing and suitable ball-races being formed by circumferential grooves around the exterior surface of the sleeve registering with corresponding circumferential grooves around the interior surface of the boxing, the sleeve having an opening through which from the interior of the sleeve the balls are inserted into the races and the strip seated in said opening, substantially as described.

3. In a ball-bearing for a wheel a hub-boxing, an axle, an axle-arm and a removable sleeve made fast upon the axle-arm and fitted into the hub-boxing, the exterior surface of the sleeve having circumferential grooves registering with corresponding grooves around the interior surface of the boxing, an opening in the sleeve through which the balls may be inserted into the races from the interior of the sleeve, the sleeve having on its interior surface a projection which fits into a corresponding indentation in the axle-arm and a suitable axle-nut arranged to come in contact with the sleeve and out of contact with the boxing in combination with the strip seated in the opening in the sleeve, substantially as described.

WILLIAM JENKINS.

Witnesses:
THOS. A. ROWAN,
EDITH LACKIE.